United States Patent [19]
Avramova et al.

[11] Patent Number: 4,895,612
[45] Date of Patent: Jan. 23, 1990

[54] METHOD FOR WELDING AND LAMINATING POLYAMIDES

[75] Inventors: Nadka V. Avramova; Stoyko C. Fakirov, both of Sofia, Bulgaria; Jerold M. Schultz, Newark, Del.

[73] Assignee: University of Delaware, Newark, Del.

[21] Appl. No.: 210,259

[22] Filed: Jun. 23, 1988

[30] Foreign Application Priority Data

Sep. 29, 1987 [BG] Bulgaria ................................. 81312

[51] Int. Cl.$^4$ ............................ C09J 3/00; C09J 5/02; B32B 27/34
[52] U.S. Cl. ................................. 156/326; 428/474.7; 428/420
[58] Field of Search ................. 156/326; 428/420, 910

[56] References Cited

U.S. PATENT DOCUMENTS 4,337,111  6/1982  Kauffman et al. ............. 428/420 X
4,575,470  3/1986  Fakirov et al. ................. 428/420 X
4,715,919  12/1987 Fakirov et al. ................. 152/326 X
4,755,431  7/1988  Fakirov et al. ...................... 428/420
4,761,184  8/1988  Markeseini et al. ............ 156/326 X

OTHER PUBLICATIONS

Lee et al., "New Linear Polymers," McGraw Hill, pp. 141–143, 164–167, (1967).
Arakawa et al., "Thermal Analysis of Drawn Nylon", J. Polymer Sci. Polym. Lett Ed. 6, 513–516, (1968).

Primary Examiner—George F. Lesmes
Assistant Examiner—Elizabeth M. Cole
Attorney, Agent, or Firm—James H. Ryan

[57] ABSTRACT

Polyamide bodies, e.g., foils or sheets, are welding together or laminated by forming methylene bridges between nitrogen atoms in the separate bodies by pressing them together in the presence of a alkaline paraformaldehyde/methanol solution containing a catalytic amount of oxalic acid.

3 Claims, No Drawings

METHOD FOR WELDING AND LAMINATING POLYAMIDES

RIGHTS OF THE U.S. GOVERNMENT

The government of the United States of America has certain rights to this invention pursuant to National Science Foundation Grant No. INT 8520639.

PRIORITY

Priority is claimed of Bulgarian Authorship (Patent) application filed under Ser. No. 81312 for "Method for Welding and Laminating Polyamides" on Sept. 29, 1987, in Sofia, Bulgaria.

BACKGROUND OF THE INVENTION

1. Field of the Invention

This invention relates to a method for welding and laminating polyamides applicable to the production of various articles widely used in the national economy.

2. Prior Art

It is known that polymer (including polyamide) laminates, can be obtained using special glues or bonding chemicals as well as dry self-bonding (e.g., of polyamide foils) at high temperatures under pressure (New Linear Polymers, H. Lee, D. Stoffery and K. Neville, McGraw-Hill Book Company (1967)).

The disadvantages of these methods are the requirements for the use of complex and expensive chemical compounds and high energy consumption. Furthermore, the bonding is not always satisfactory, and the bonding compounds are often deleterious with respect to the properties of the polymer used, e.g., they lower its thermal stability. Laminating of oriented foils at high temperature by self-bonding leads to a decrease in the degree of orientation and hence to deterioration of the physicomechanical characteristics of the laminate obtained.

It is known that polyamide-6 can be crosslinked in the amorphous regions by methoxy-methylation (methylene bridges bond together the amide groups of neighboring macrochains) (I. Arakawa, F. Nagatoshi and N. Arai, J. Polym. Sci., Polym. Lett. Ed., 6 513-516 (1968)). For this purpose, polyamide is dipped into a solution of paraformaldehyde in methanol with the addition of small amounts of potassium hydroxide and anhydrous oxalic acid. After 30 hours at 30° C., the crosslinking agent penetrates into the polymer and reacts with the amide groups, making bridges of methylene groups.

Crosslinking improves the polymer strength but it has the following disadvantages. When carried out on polymer granules, the subsequent processing of the polymer will be hampered due to the rise of the viscosity of its melt. Moreover, since the penetration of the crosslinking agent into the polymer is a slow diffusion process, the methoxy-methylation of polyamide articles having a considerable volume can prove too time-consuming from the viewpoint of its application on an industrial scale.

DESCRIPTION OF THE INVENTION

The object of this invention is to provide a method for welding and laminating polyamides by creating a chemical bond between separate polyamide bodies and avoiding residual substances which could change the polyamide properties and the use of severe conditions (high temperature) which worsen the quality of the starting polymer material, especially in the case when the latter has been subjected to a preliminary orientation.

In this invention, welding (or lamination) of a polymer containing amide groups is carried out by the creation of methylene bridges between the nitrogen atoms of two closely situated amide groups. In this case, the methoxy-methylation reaction occurs between the contacting surfaces of two physically independent, separate bodies or substrates. The basis amide of the substrates may be alike or different and synthetic (polyamide-6, polyamide-12, etc.) or natural (protein, polypeptide, etc.).

The polyamide bodies are coated (wetted) with a methoxy-methylating solution of paraformaldehyde in methanol (paraformaldehyde:methanol from 0.1:1 to 1:5 to which traces of KOH are added); they are then pressed together (pressure of 0.005 to 5 MPa) in order to achieve a good contact between the surfaces and the solution. This operation is carried out at a temperature of 5° to 40° C. for 30 minutes to 36 hours. A measurable effect can be observed even after 30 minutes while after 36 hours weld is so strong that in a shear test the material breaks outside the welded area.

The advantages of the method according to the invention are as follows. Unlike the known methods, welding is not a mechanical one since it is based on the formation of a chemical bond and for this reason, it is very strong. The method does not require energy consumption since it can be carried out even without heating. An additional advantage is based on this fact: in the case of lamination of oriented foils, they preserve their oriented state and in all cases the polymer does not undergo any unfavorable changes caused by heating. Moreover, by using thin polyamide foils the formation of methylene bridges (crosslinking) takes place in the entire volume of the obtained laminate, regardless of its thickness. The proposed method is convenient and simple, it does not require expensive bonding compounds, it lacks a second material. Last but not least, an important advantage of the proposed method consists in the possibility of welding two, three or more physically different bodies even if they differ in their chemical nature, e.g., synthetic polyamides like polyamide-6, polyamide-12, etc., as well as natural proteins, e.g., animal membranes and polypeptides. The sole condition for the formation of a chemical bond according to the method of the present invention is the presence of amide groups (—CO—NH—) in the polymer macromolecule.

EXAMPLE

Oriented or isotropic polyamide foils (sheets) are coated (wetted) uniformly with a methoxy-methylating solution prepared as follows. Paraformaldehyde (75 g) and potassium hydroxide (0.1 g) are added to 75 g of methanol. The mixture is heated at 60° C. until it gives a clear liquid. 6 g of anhydrous oxalic acid is then added as the catalyst of the reaction. Foils coated with the above mixture are pressed in a drill press vise and are stored there for 36 hours at a temperature of 30° C.

Having described our invention,
We claim:

1. A process for welding and laminating polyamides which comprises:
    wetting separate polyamide bodies with a solution of paraformaldehyde in paraformaldehyde methanol containing traces of an alkali metal hydroxide and a catalytic amount of anhydrous oxalic acid, and subsequently pressing the wetted polyamide bodies at a pressure of about 0.05 to 5 MPa at a temperature of from 5° to 40° C. for a time sufficient to create methylene bridges between nitrogen atoms of the separate methylene bodies.

2. The process of claim 1 wherein the methanol-paraformaldehyde ratio is in the range 0.2:1–1:5 parts by weight.

3. The process of claim 1 wherein the wetted bodies are pressed for a period of from about 30 minutes to about 36 hours.

* * * * *